United States Patent
Childs et al.

(10) Patent No.: US 7,996,355 B2
(45) Date of Patent: Aug. 9, 2011

(54) APPARATUS, SYSTEM, AND METHOD FOR IDENTIFYING TIME-BASED INFORMATION WITH HISTORICAL EVENTS

(75) Inventors: Philip Lee Childs, Raleigh, NC (US); Michael Terrell Vanover, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 394 days.

(21) Appl. No.: 12/059,901

(22) Filed: Mar. 31, 2008

(65) Prior Publication Data

US 2009/0248664 A1    Oct. 1, 2009

(51) Int. Cl.
G06F 7/00 (2006.01)
G06F 17/00 (2006.01)
G06F 17/30 (2006.01)

(52) U.S. Cl. ........... 707/602; 707/713; 707/704; 726/26

(58) Field of Classification Search .................. None
See application file for complete search history.

(56) References Cited

U.S. PATENT DOCUMENTS

| | | | |
|---|---|---|---|
| 7,127,441 B2 * | 10/2006 | Musman | 706/47 |
| 2005/0188078 A1 * | 8/2005 | Kotzin et al. | 709/224 |
| 2005/0188406 A1 * | 8/2005 | Gielow et al. | 725/81 |
| 2009/0013347 A1 * | 1/2009 | Ahanger et al. | 725/36 |

* cited by examiner

*Primary Examiner* — Fred I Ehichioya
*Assistant Examiner* — Loan T Nguyen
(74) *Attorney, Agent, or Firm* — Kunzler Needham Massey & Thorpe

(57) ABSTRACT

An apparatus, system, and method are disclosed for identifying time-based information. A detection module detects time-based information. A selection module monitors events in an information stream. The information stream is of interest to a target user. In addition, the information stream is not related by content to the time-based information. The selection module further selects a first event with temporal relation to the time-based information. An association module associates the first event and the time-based information.

18 Claims, 7 Drawing Sheets

APPARATUS, SYSTEM, AND METHOD FOR IDENTIFYING TIME-BASED INFORMATION WITH HISTORICAL EVENTS

BACKGROUND OF THE INVENTION

1. Field of the Invention

This invention relates to identifying information and more particularly relates to identifying time-base information with historical events.

2. Description of the Related Art

Information systems such as data processing systems, e-mail systems, voicemail systems, and the like are generating increasing amounts of information. This information is typically stored so that it can be referenced in the future.

The large volume of such information that is stored often makes it difficult to find desired information. As a result, information systems often include sortable and searchable fields when storing data. For example, a digitized invoice may be searchable by payee, account, and date of receipt. Similarly, email and voicemail messages may be searchable by sender and/or topic. Desired information may be retrieved by searching for attributes in the searchable fields.

The information is often time-based, with a time of creation and/or receipt. For example, backups of data on a data processing system may be organized by the date and time of creation. Alternatively, information that is received as paper copies such as invoices may also be digitized and sortable by date of receipt. Time-based information is particularly useful when there are many instances of information that share other search criteria. For example, an information system may search for a particular backup data instance using a date of creation.

Unfortunately, it is often difficult to associate the time-based information with the information that is sought. For example, a user may have forgotten the date that important information was backed up. As a result, the user may be forced to review a number of backup copies in order to find and retrieve the important information.

SUMMARY OF THE INVENTION

From the foregoing discussion, there is a need for an apparatus, system, and method that identifies time-based information. Beneficially, such an apparatus, system, and method would associate historical events with the time-based information.

The present invention has been developed in response to the present state of the art, and in particular, in response to the problems and needs in the art that have not yet been fully solved by currently available information identifying methods. Accordingly, the present invention has been developed to provide an apparatus, system, and method for identifying time-based information with historical events that overcome many or all of the above-discussed shortcomings in the art.

The apparatus to identify time-based information is provided with a plurality of modules configured to functionally execute the steps of detecting time-based information, monitoring events in an information stream, and associating an event at the time-based information. These modules in the described embodiments include a detection module, a selection module, and an association module.

The detection module detects time-based information. The selection module monitors events in an information stream. The information stream is of interest to a target user. In addition, the information stream is not related by content to the time-based information. The selection module further selects a first event with temporal relation to the time-based information. The association module associates the first event and the time-based information.

A system of the present invention is also presented to identify time-based information. The system may be embodied in a data processing system. In particular, the system, in one embodiment, includes a Really Simple Syndication (RSS) feed information stream, time-based information, and an identification apparatus.

The information stream is of interest to a target user. The time-based information is not related by content to the information stream. The identification apparatus includes a detection module, a selection module, and an association module.

The detection module detects time-based information. The selection module monitors events in the information stream. In addition, the selection module selects a first event with temporal relation to the time-based information. The association module associates the first event and the time-based information.

A method of the present invention is also presented for identifying Time-based information. The method in the disclosed embodiments substantially includes the steps to carry out the functions presented above with respect to the operation of the described apparatus and system. In one embodiment, the method includes detecting time-based information, monitoring events in an information stream, and associating an event at the time-based information.

A detection module detects time-based information. A selection module monitors events in an information stream. The information stream is of interest to a target user. In addition, the information stream is not related by content to the time-based information. The selection module further selects a first event with temporal relation to the time-based information. An association module associates the first event and the time-based information.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention associates historical events with time-based information. In addition, the present invention supports the identification of the time-based information using the historical events. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
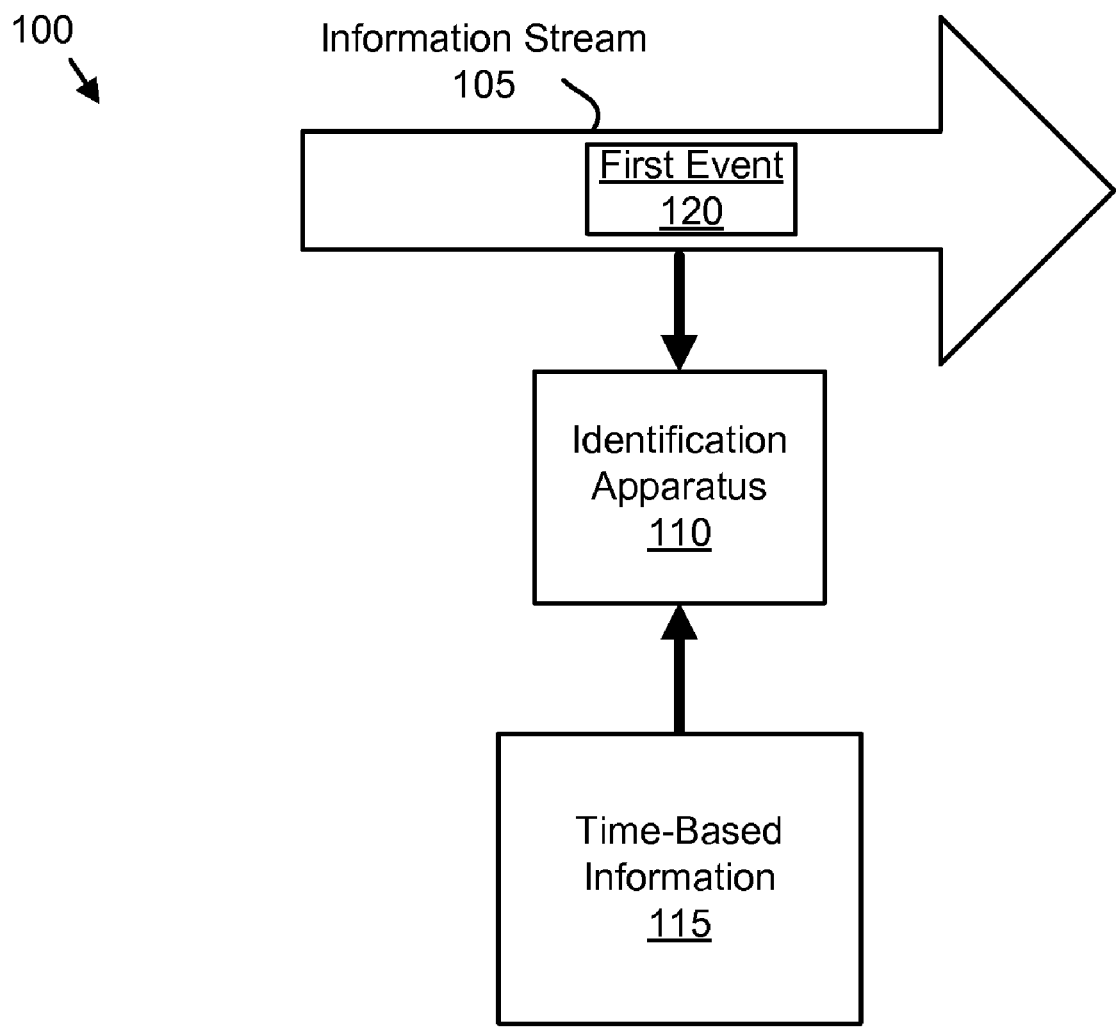
FIG. 1 is a schematic block diagram illustrating one embodiment of an identification system in accordance with the present invention.

FIG. 1 is a schematic block diagram illustrating one embodiment of an identification system 100 in accordance with the present invention. The system 100 includes an information stream 105, an identification apparatus 110, and time-based information 115.

The time-based information 115 may be generated by a computer, a telephone, a cellular telephone, a personal digital assistant (PDA), or the like. For example, the time-based information may be backup data, e-mail messages, voice mail messages, and the like. Alternatively, the time-based information 115 may be physically received by a user. For example, time-based information may include letters, invoices, bills, checks, credit card receipts, business cards, and the like. The letters, invoices, bills, checks, credit card receipts, and business cards may be digitized into a computer readable form.

In one embodiment, the time-based information 115 is regularly generated and/or received. For example, a user may receive a number of e-mail messages each day. While the user may delete some e-mail messages, the user may retain other e-mail messages for future reference.

The time-based information 115 may be stored for future retrieval. Typically, the time-based information 115 is indexed with the date and time, and perhaps also a description of the contents. However, the user is often unable to remember a specific date and time that desire of time-based information 115 is stored under. In addition, the time-based information 115 may include many instances with similar descriptions of the contents.

As a result, the user must often sort through much time-based information 115 before finding a desired instance of time-based information 115. The present invention associates in an event with the time-based information 115 to aid in the identification and retrieval of the time-based information 115 as will be described hereafter.

The identification apparatus 110 identifies the time-based information 115 using events from the information stream 105. The information stream 105 is of interest to a target user. For example, the information stream 105 may be an RSS feed that is regularly viewed by the target user. In one embodiment, the information stream 105 is a sports news RSS feed. Alternatively, the information stream may be a financial news RSS feed.

The information stream 105 may also be a webpage that is viewed by the target user. For example, the information stream 105 may be a national news webpage that is frequently viewed by the target user. Alternatively, the information stream 105 may be a sports news webpage.

In one embodiment, the information stream 105 is a calendar. The calendar may be an electronic database of appointments in advance stored on a computer or PDA. In a certain embodiment, the calendar comprises entries in a billing system. The information stream 105 may also be a database of email messages, a database of voicemail messages, and the like. In one embodiment, time-based information 115 from a first context may be used as an information stream 105 is a second context.

The information stream 105 includes a plurality of events. An event may be an item of an RSS feed, a webpage, a calendar entry, or the like. The information stream 105 is depicted with the first event 120.

Figure 2:
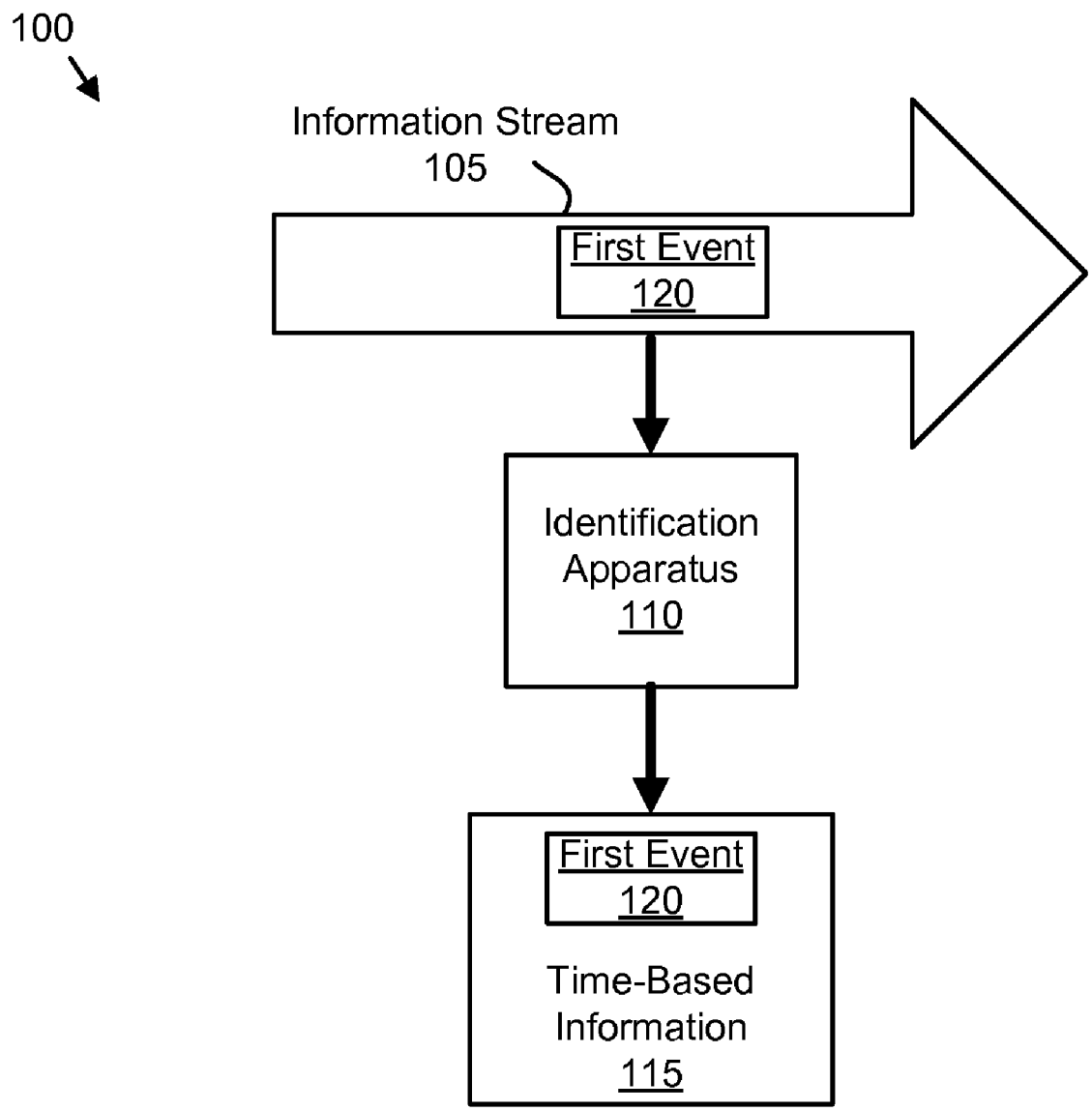
FIG. 2 is a schematic block diagram illustrating one alternate embodiment of the identification system of the present invention.

FIG. 2 is a schematic block diagram illustrating one alternate embodiment of the identification system 100 of the present invention. The system 100 of FIG. 1 is shown with the identification apparatus 110 associating the first event 120 with the time-based information 115. The description of FIG. 2 refers to elements of FIG. 1, like numbers referring to like elements.

For example, the time-based information 115 may be an invoice. A user may receive the invoice and enter the invoice into an accounting software application. The identification apparatus 110 may select the first event 120 from the information stream 105 and associate the first event with the invoice as will be described hereafter. The invoice time-based information 115 may thus be identified using the first event 120. Thus if the first event 120 is a webpage containing an article describing a severe winter storm, the webpage is associated with the invoice. The webpage association may be then used to identify and retrieve the invoice a later date as will be described hereafter.

In an alternate example, the time-based information 115 may comprise contact information. The time-based information 115 may be generated by scanning a business card and/or from an entry in a contact database. The identification apparatus 110 may select the first event 120 from the information stream 105 based at the time that the contact information is generated. For example, the first event 120 may occur on the day data business card is scanned into a contact database.

Figure 3:
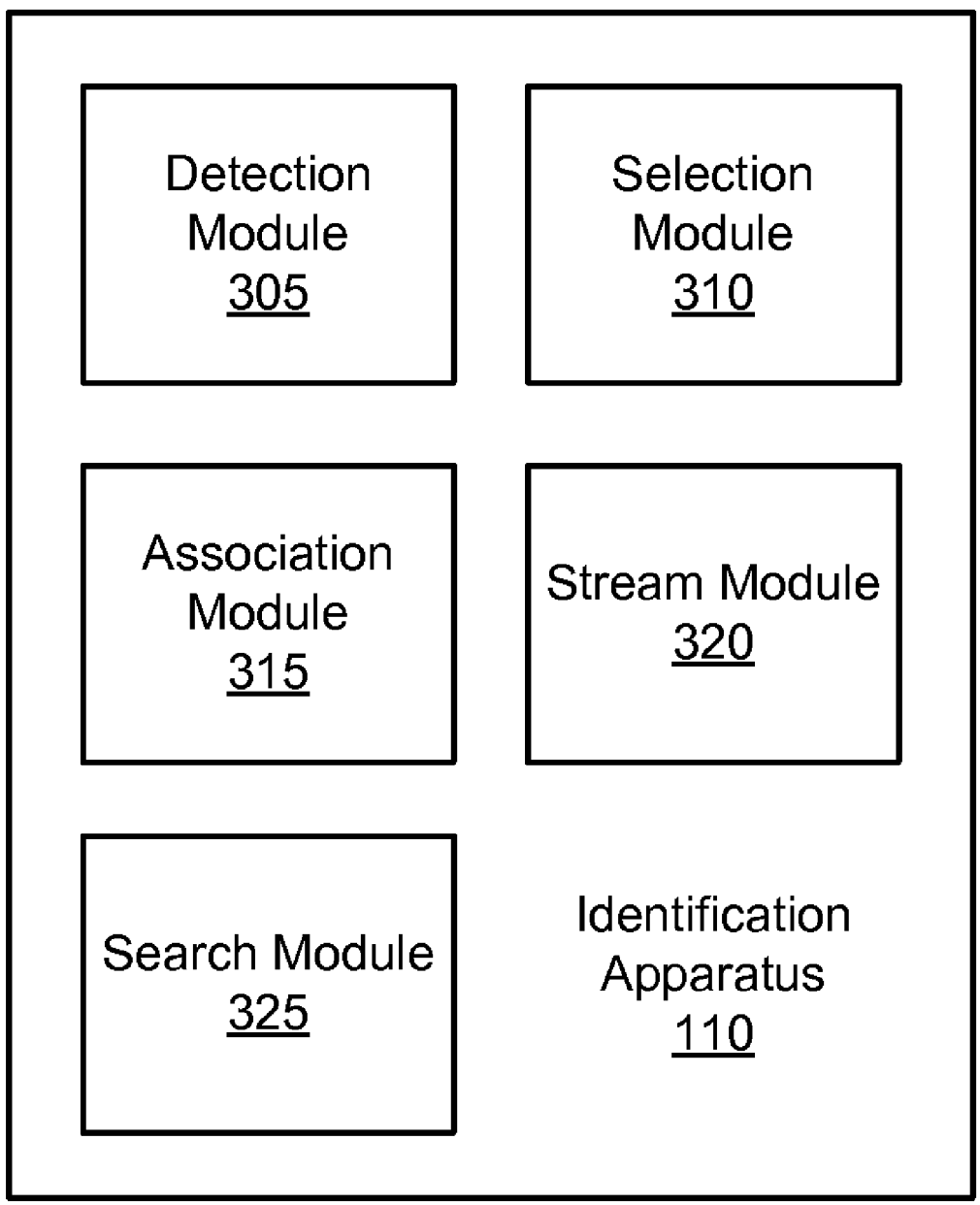
FIG. 3 is a schematic block diagram illustrating one embodiment of an identification apparatus of the present invention.

FIG. 3 is a schematic block diagram illustrating one embodiment of an identification apparatus 110 of the present invention. The identification apparatus 110 is the identification apparatus 110 of FIGS. 1-2. The description of the identification apparatus 110 refers to elements of FIGS. 1-2, like numbers referring to like elements. The apparatus 110 includes a detection module 305, a selection module 310, an association module 315, a stream module 320, and a search module 325.

The stream module 320 selects the information stream 105 from a plurality of information streams. The information stream 105 is of interest to the user and not related by content to the time-based information 115. In one embodiment, the stream module monitors information stream usage patterns of the target user. In addition, the stream module 320 may select the information stream 105 using the usage patterns.

In an alternate embodiment, the stream module 320 selects the information stream 105 in response to a target user command. For example, the target user may specify the information stream 105 through a GUI. The stream module 320 may comprise a computer program product. A computer program product may include a computer usable medium having a computer readable program stored in a tangible storage device. The storage device may be but is not limited to a semiconductor memory, an optical storage device, a hard disk drive, and the like.

The detection module 305 detects the time-based information 115. In one embodiment, the detection module 305 detects the creation of the time-based information 115. The detection module 305 may comprise a computer program product.

The selection module 310 monitors events in the information stream 105. In addition, the selection module 310 selects an event such as the first event 120. The selected event has a temporal relation to the time-based information 115. In one embodiment, the selected event occurred within 24 hours of the time-based information 115. Alternatively, the selected event may have occurred within seven days of the time-based information 115.

The association module 315 associates the selected first event 120 with the time-based information 115. In one embodiment, the association module 315 incorporates the selected first event 120 as metadata that is stored with the time-based information 115. The association module 315 may comprise a computer program product.

The search module 325 may receive a time interval selection from a GUI. The time interval selection may comprise a starting time and ending time. For example, the time interval selection may include a starting time of Jun. 1, 2009 and an ending time of Jun. 8, 2009. Alternatively, the time interval selection may comprise a target time and a duration. For example, a time interval selection may include a target time of May 22, 2009 at 12:01 p.m. and a duration of one week.

In one embodiment, the search module 325 displays a plurality of events associated with a plurality of time-based information 115 within the time interval. In addition, the search module 325 may receive a user selection of a displayed event and retrieve the time-based information 115 associated with the selected event. The search module may comprise a computer program product.

In one embodiment, the identification apparatus 110 is integrated into application software. For example, the identification apparatus 110 may be integrated into a data backup application.

In an alternate embodiment, the identification apparatus 110 may be a stand-alone software application. The identification apparatus 110 may associate events with a general category of time-based information 115. For example, the identification apparatus 110 may associate an event with each calendar day. The events may be subsequently used to identify the calendar day and identify a starting point for searching for specific time-based information 115 that occurred on that date.

Figure 4:
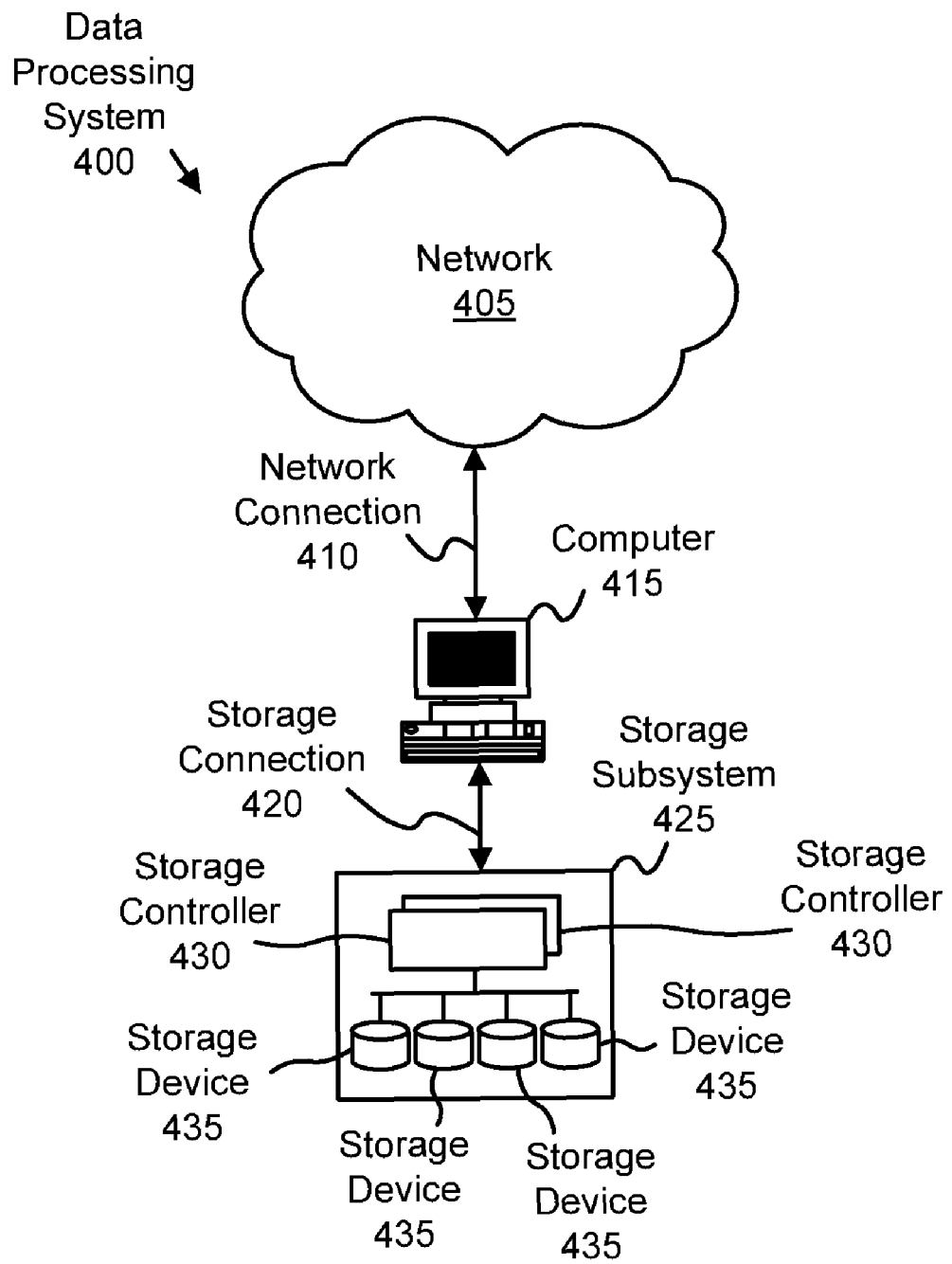
FIG. 4 is a schematic block diagram illustrating one embodiment of a data processing system of the present invention.

FIG. 4 is a schematic block diagram illustrating one embodiment of a data processing system 400 of the present invention. The system 400 illustrates a specific embodiment of the present invention. However, one of skill in the art will recognize that the present invention may be practiced in other embodiments. The system 400 includes a network 405, a network connection 410, a computer 415, a storage subsystem 425, and a storage connection 420. The storage subsystem 425 may include one or more storage controllers 430 and one or more storage devices 435. The description of the system 400 refers to elements of FIGS. 1-3, like numbers referring to like elements.

The identification apparatus 110 of FIG. 3 may be embodied in the computer 415. For example, the identification apparatus 110 may comprise a plurality of computer program products that are stored in a semiconductor memory of the computer 415 and executed by a processor of the computer 415.

In one embodiment, the storage subsystem 425 stores a plurality of backup copies of data stored on the computer 415. The storage subsystem 425 may regularly retrieve data from the computer 415 and store the data on a storage device 435. The storage connection 420 may be a Local Area Network (LAN), a Wide Area Network (WAN), or the like.

The backup copies of data may each include a timestamp that identifies a date and the time when the backup copy was created. The backup copies are one embodiment of time-based information 115. In the past, a user to have only had the time stamp in order to identify a desired backup copy. The present invention provides a richer identification environment by providing an event that may further identify the backup copy.

The information stream 105 of FIGS. 1-2 may be provided by the network 405. The network 405 may be the Internet. The network connection 410 may employ the Transmission Control Protocol/Internet Protocol (TCP/IP). In one embodiment, the network connection 410 is configured as an Ethernet channel. The computer 415 may monitor the information stream 105 through the network 405.

Figure 5:
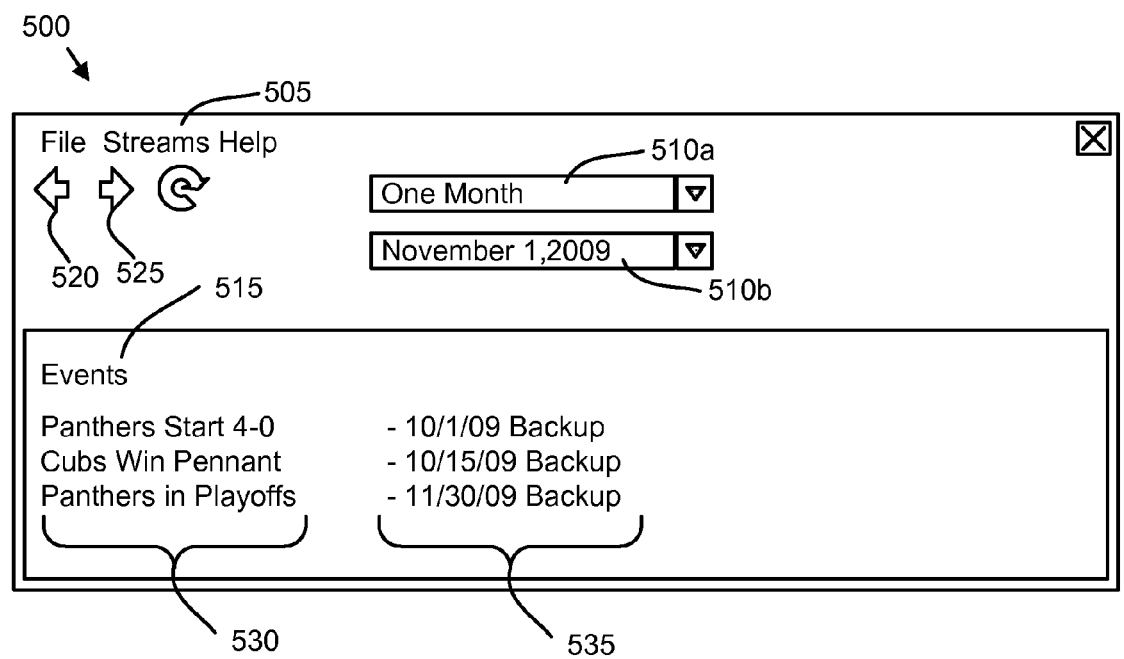
FIG. 5 is a drawing illustrating one embodiment of a selection Graphical User Interface (GUI) of the present invention.

FIG. 5 is a drawing illustrating one embodiment of a selection GUI 500 of the present invention. The search module 325 of FIG. 3 may include the GUI 500. A user may employ the GUI 500 to select time-based information 115 using associated events. The description of the GUI 500 refers to elements of FIGS. 1-4, like numbers referring to like elements. The GUI 500 includes menu commands 505, time interval selection fields 510, and a search results field 515.

The menu commands 505 may be selected by a user using an input device such as a mouse as is well known to those of skill in the art. The menu commands 505 include a previous events button 520 and a subsequent events button 525.

The GUI 500 as depicted shows time interval selection fields 510. However, one of skill in the art will recognize that the time interval selection function may be performed by a wide variety of GUI controls and fields. The time interval selection fields 510 include a duration time interval selection field 510a and a target time interval selection field 510b.

In one embodiment, the user selects a target date using the target time interval selection field 510b. The target date may be the user's best guess as to when the time-based information 115 may have been stored. The user further selects the duration time interval selection field 510a to specify a time before and after the target date that should be searched.

The GUI 500 displays a plurality of event references 530 and time-based information references 535 in the search results field 515. In an alternate embodiment, the event references 530 may comprise images such as a web page image. The search module 320 may receive a user selection of a displayed event from the plurality of event references 530. For example, a user may select a displayed event using a mouse.

In one embodiment, a selection of the previous events button 520 causes the GUI 500 to display additional event references backwards in time from the displayed plurality of event references 530. Similarly, a selection of a subsequent events button 525 may cause the GUI 500 to display additional event references forwards in time from the displayed plurality of event references 530.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
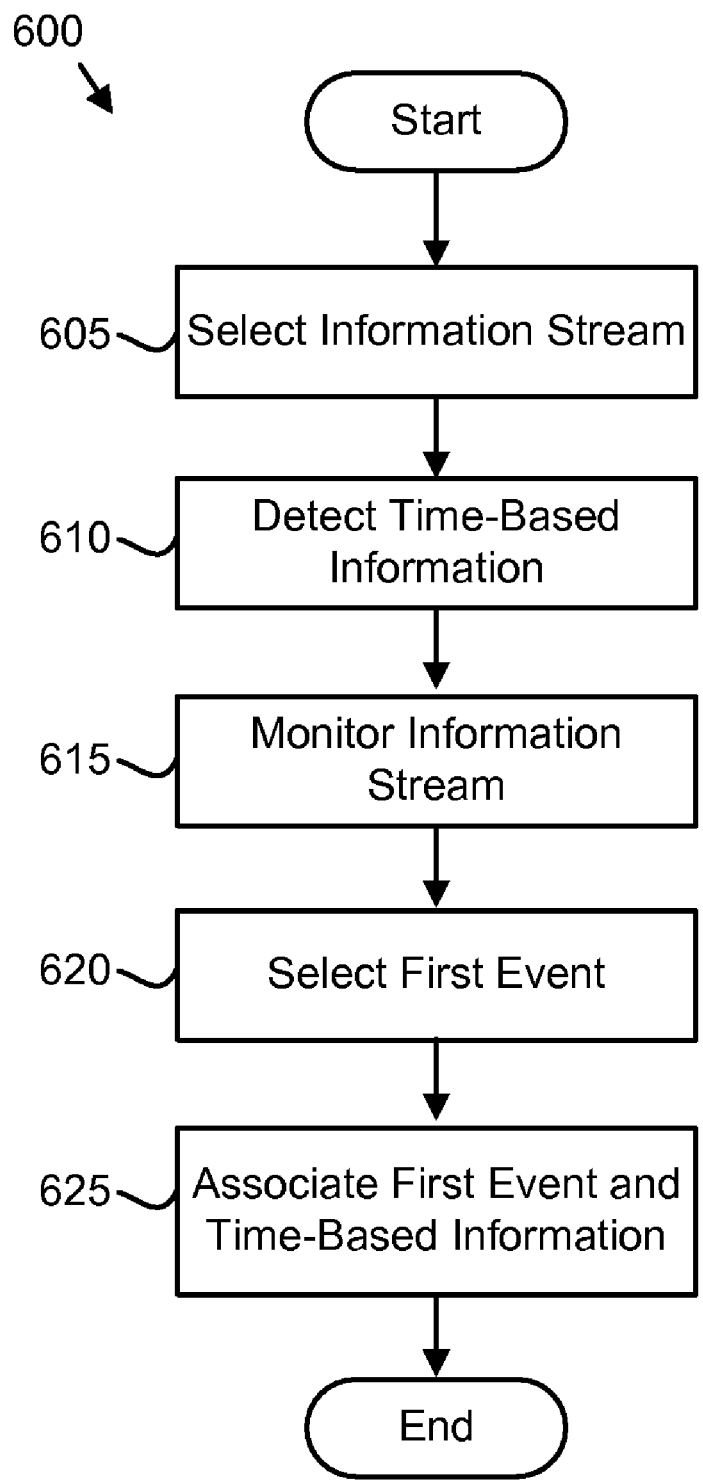
FIG. 6 is a schematic flow chart diagram illustrating one embodiment of a event association method of the present invention.

FIG. 6 is a schematic flow chart diagram illustrating one embodiment of a event association method 600 of the present invention. The method 600 substantially includes the steps to carry out the functions presented above with respect to the operation of the described apparatus 110, 500 and system 100, 400 of FIGS. 1-5. In one embodiment, the method 600 is implemented with a computer program product comprising a computer readable medium having a computer readable program. The computer readable program may be executed by the computer 410 of FIG. 4. The description of the method 600 refers to elements of FIGS. 1-5, like numbers referring to like elements.

The method 600 begins, and in one embodiment, the stream module 320 selects 605 the information stream 105 from a plurality of information streams. In a certain embodiment, a user may select one or more information streams that are of interest. The stream module 320 may select the information stream 105 from the information streams that are of interest.

For example, the user may select a sports news RSS feed, financial news RSS feed, and a calendar as information streams 105. The stream module 320 may select either the sports news RSS feed, the financial news RSS feed, or the calendar as the target information stream 105. In one embodiment, the stream module 320 selects the information stream 105 with significant activity. For example, the stream module 320 may select 605 the sports news RSS feed on a day with significant sports news, while selecting 605 the calendar on a day that a significant all-day event is scheduled.

The detection module 305 detects 610 the time-based information 115. In one embodiment, the detection module 305 detects 610 the time-based information 115 as the time-based information 115 is entered into a digital data structure. The digital data structure may be a database, a linked list of data arrays, a flat file, or the like. For example, the detection module 305 may detect 610 a receipt that is scanned into an accounting system. The receipt may be the time-based information 115. The detection module 305 detects 610 the scanning of the receipt as time-based information 115.

Alternatively, the detection module 305 may detect 610 the creation of the time-based information 115. For example, the detection module 305 may detect 610 the creation of backup data as the time-based information 115.

In one embodiment a user may issue a command through a GUI that is detected 610 by the detection module 305. The detection module 305 may detect 610 the time-based information 115 in response to the command.

The selection module 310 monitors 615 events in the selected information stream 105. In one embodiment, the selection module 310 stores events in a buffer. For example, a selection module 310 may store sports news stories from a sports news RSS feed in a buffer. In an alternate embodiment, the selection module 310 monitors 615 events from a plurality of selected information streams 105. In one embodiment, the selection module 310 ranks the events based on a perceived interest by a target user. For example, the selection module 310 may rank sports news relating to a local sports team more highly than sports news relating to a distant sports team. Similarly, the selection module 310 may rank sports news relating to significant sporting events higher than news relating to relatively minor sporting events.

The selection module 310 further selects 620 a first event 120 with temporal relation to the time-based information 115. In one embodiment, the selection module 310 selects 620 the first event 120 that occurred closest to the detection 610 of the time-based information 115. For example, the selection module 310 may select a sports news item that is monitored 615 immediately prior to the time-based information 115.

Alternatively, the selection module 310 may select 620 highest ranked event for the day as the first event 120. For example, the selection module 310 may have previously ranked a sports news item relating to a World Series victory as the highest ranking event from the information stream 105. As a result, the selection module 310 may select 620 World Series victory event as the first event 120.

The association module 315 associates 625 the first event 120 and the time-based information 115 and the method 600 ends. In one embodiment, the association module 315 appends a description of the first event 120 to metadata for the time-based information 115. In an alternate embodiment, the association module 315 appends a pointer for the first event 120 to the time-based information 115. The association module 315 may capture an image of the first event 120 and append the image to the time-based information metadata. For example, the association module 315 may append an image of a web page to the time-based information metadata.

In one embodiment, the association module 315 associates 625 the first event 120 with the time-based information 115 when the time-based information 115 is created. For example, the association module 315 may associate 625 a news webpage first event 120 with the scanned invoice time-based information 115 when the time-based information 115 is created by scanning the invoice.

In an alternate embodiment, the association module 315 associates 625 the first event 120 with the time-based information 115 subsequent to the creation of the time-based information 115. For example, the association module 315 may select a highest ranked event stored in a buffer as a first event 120 at the end of each day. The association module 315 may then associate 625 the selected first event 120 with all time-based information 115 that was created and/or received during the day.

The method 600 associates the first event 120 with time-based information 115 so that the first event 120 may provide additional identification information about the time-based information 115. The first event 120 may be used to identify the time-based information 115 as will be described hereafter.

Figure 7:
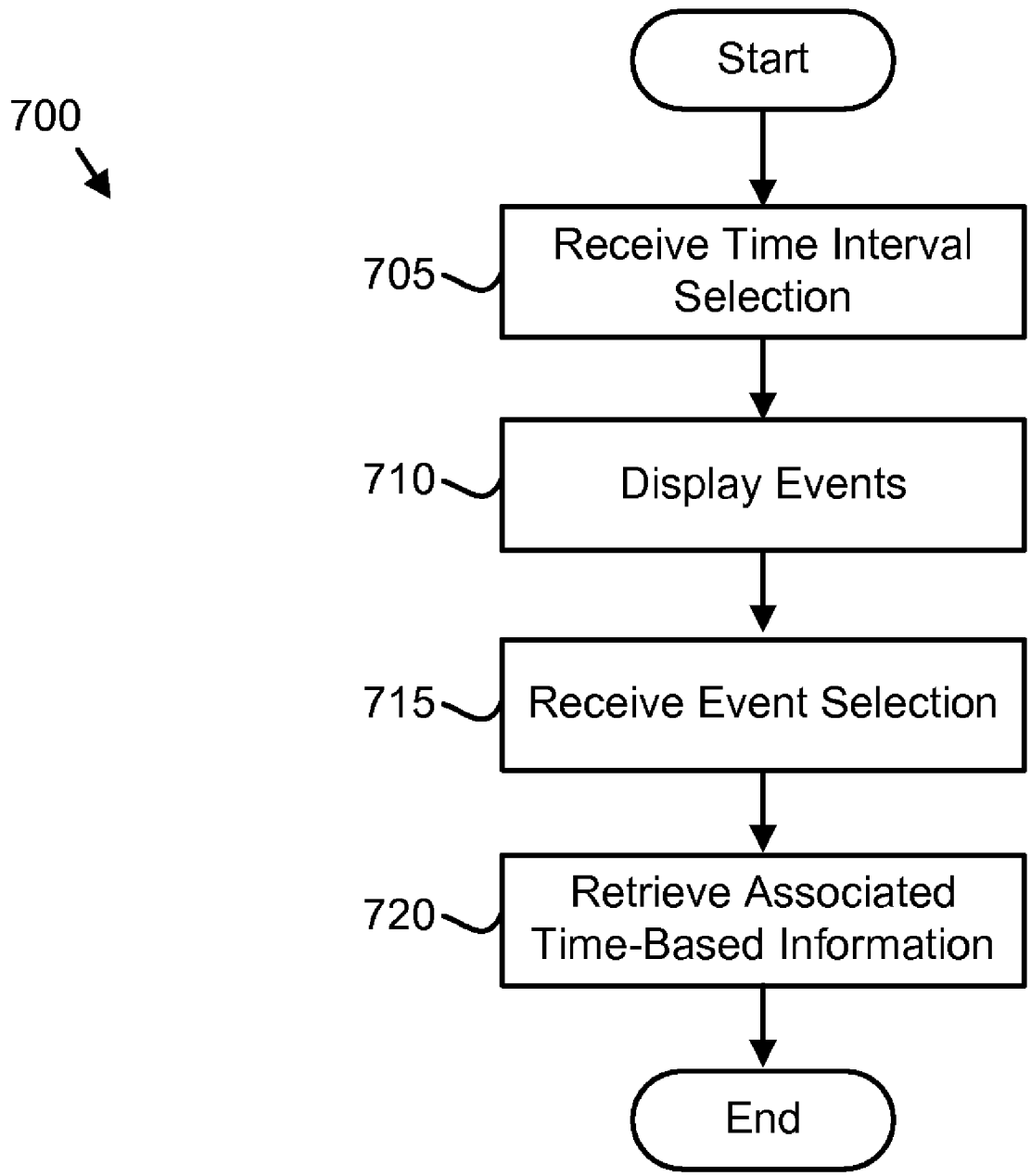
FIG. 7 is a schematic flow chart diagram illustrating one embodiment of a time-based information identification method of the present invention.

FIG. 7 is a schematic flow chart diagram illustrating one embodiment of a time-based information identification method 700 of the present invention. The method 700 substantially includes the steps to carry out the functions presented above with respect to the operation of the described apparatus 110, 500 and system 100, 400 of FIGS. 1-5. In one embodiment, the method 700 is implemented with a computer program product comprising a computer readable medium having a computer readable program. The computer readable program may be executed by the computer 410 of FIG. 4. The description of the method 700 refers to elements of FIGS. 1-5, like numbers referring to like elements.

The method 700 begins and in one embodiment, the search module 325 receives a time interval selection from the GUI 500. The time interval selection may be entered into the time interval selection fields 510. In one embodiment, the time interval selection indicates approximately when a user believes that time-based information 115 is time stamped as created and/or received.

In one embodiment, the search module 325 displays 710 a plurality of event references 530 associated with a plurality of time-based information 115 within the time interval. The plurality of event references 530 may each have a time stamp that falls within the time interval selection. For example, each of the time-based information references 535 shown in FIG. 5 falls within the time interval selection specified by the time interval selection fields 510.

In addition, the search module 325 may receive 715 a selection of a displayed event reference 530. In one embodiment, the selection is received through the GUI 500. For example, the user may use an input device such as a mouse to select an event.

In one embodiment, the search module 325 retrieves 720 the time-based information 115 associated with the selected event and the method 700 ends. For example, the search module 325 may retrieve 720 a backup copy for the computer 410 that is associated with the selected event reference 530. In an alternate example, the search module 325 may retrieve 720 a digitized invoice associated with the selected event reference 530.

The present invention associates historical events with time-based information 115. In addition, the present invention supports the identification of the time-based information 115 using the historical events. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computer readable storage device storing a computer readable program executable by a processor, the computer readable program comprising:
   a detection module detecting time-based information;
   a selection module monitoring events in an information stream, wherein the RSS information stream is an Internet feed of interest to a target user and not related by content to the time-based information, and selecting a first event occurring closest to the detection of the time-based information;
   an association module appending a description of the first event to the time-based information, the time-based information stored for future retrieval; and
   a selection module receiving a time interval selection, displaying a plurality of events associated with a plurality of time-based information within the time interval, receiving a user selection of the displayed first event, and the retrieving time-based information to which the description of the first event is appended.

2. The apparatus of claim 1, the computer readable program further comprising a stream module selecting the RSS information stream from a plurality of information streams.

3. The apparatus of claim 2, wherein the stream module monitors target user RSS information stream usage patterns and selects the information stream using the usage patterns.

4. The apparatus of claim 2, wherein the stream module selects the information stream in response to a target user command.

5. The apparatus of claim 1, the search module further displaying additional events forwards and backwards in time from the displayed plurality of events in response to a target user command.

6. The apparatus of claim 1, wherein the information stream is a Really Simple Syndication (RSS) feed.

7. The apparatus of claim 1, wherein the information stream is a calendar.

8. The apparatus of claim 1, wherein the information stream is a web page.

9. A computer program product comprising a computer useable medium having a computer readable program stored on a tangible storage device and executable by a processor to:
   detect first time-based information;
   monitor events in an information stream, wherein the information stream is of an Internet feed interest to a target user and not related by content to the time-based information, and select a first event occurring closest to the detection of the time-based information;
   append a description of the first event to the first time-based information, the first time-based information stored for future retrieval;

receive a time interval selection;

display a plurality of events associated with a plurality of time-based information within the time interval;

receive a user selection of the displayed first event; and retrieve the time-based information to which the description of the first event is appended.

10. The computer program product of claim 9, the computer readable program further causing the computer to select the information stream from a plurality of information streams.

11. The computer program product of claim 10, the computer readable program further causing the computer to monitor target user information stream usage patterns and select the information stream using the usage patterns.

12. The computer program product of claim 10, the computer readable program further causing the computer to select the information stream in response to a target user command.

13. The computer program product of claim 9, the computer readable program further causing the computer to display additional events forwards and backwards in time from the displayed plurality of events in response to a target user command.

14. A system comprising:

an RSS feed information stream of interest to a target user;

time-based information not related by content to the information stream;

an identification apparatus comprising a computer readable storage device storing a computer readable program executed by a processor, the computer readable program comprising:

a detection module detecting the time-based information;

a selection module monitoring events in the RSS information stream and selecting a first event occurring closest to the detection of the time-based information;

an association module appending a description of the first event to the time-based information, the time-based information stored for future retrieval; and a selection module receiving a time interval selection, displaying a plurality of events associated with a plurality of time-based information within the time interval, receiving a user selection of the displayed first event, and retrieving the time-based information to which the description of the first event is appended.

15. The system of claim 14, wherein the time-based information comprises backup data.

16. The system of claim 14, wherein the time-based information comprises e-mail messages.

17. The system of claim 14, wherein the time-based information comprises voicemail messages.

18. The system of claim 14, wherein the time-based information comprises contact information.

\* \* \* \* \*